March 26, 1929.  R. S. BROWN  1,706,650
MORTISER
Filed Dec. 30, 1925  4 Sheets-Sheet 1

INVENTOR
Robert S. Brown
BY
ATTORNEY

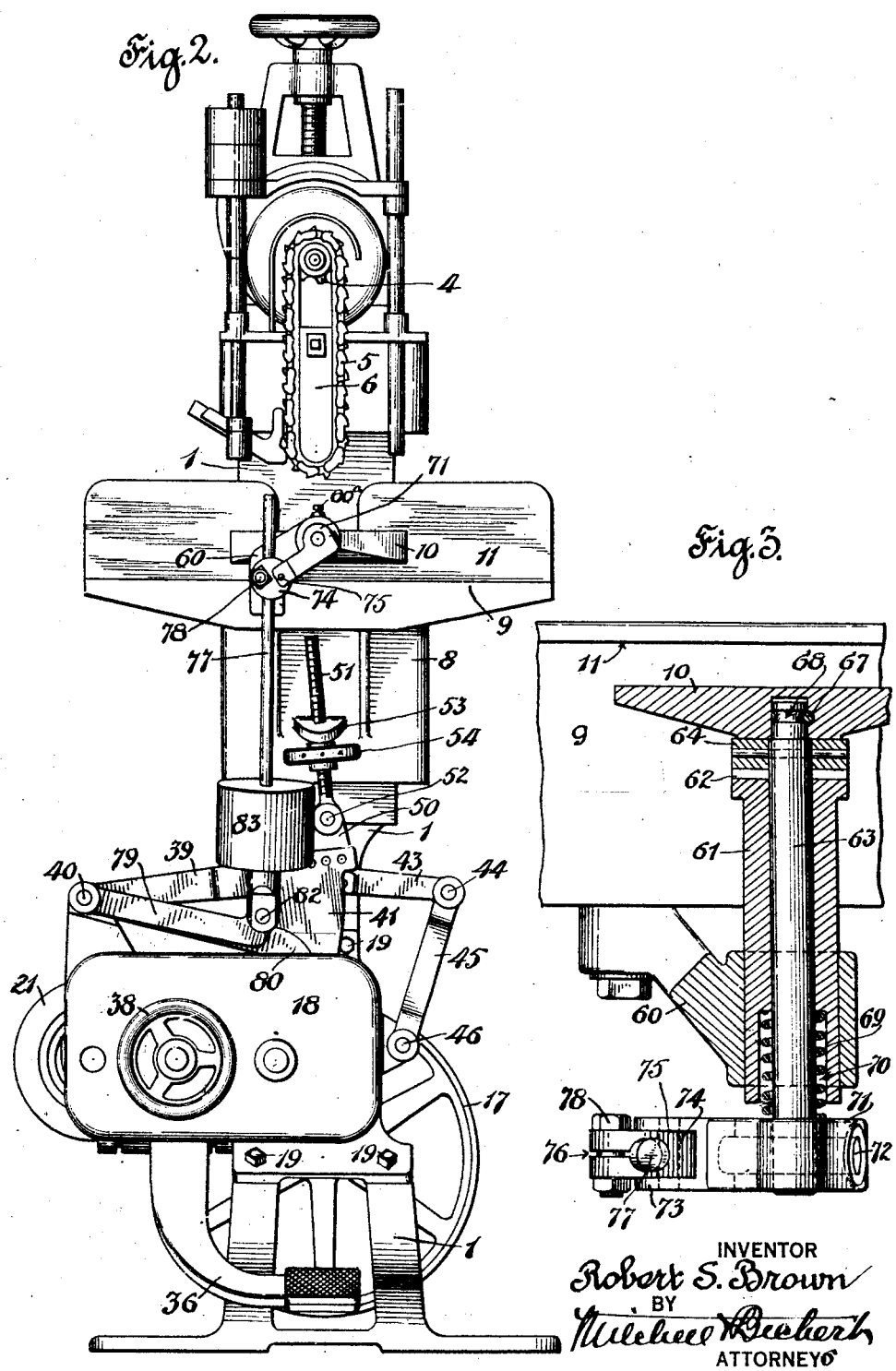

March 26, 1929.  R. S. BROWN  1,706,650
MORTISER
Filed Dec. 30, 1925  4 Sheets-Sheet 3

INVENTOR
Robert S. Brown
BY
ATTORNEYS

March 26, 1929.    R. S. BROWN    1,706,650
MORTISER
Filed Dec. 30, 1925    4 Sheets-Sheet 4

INVENTOR
Robert S. Brown
BY
Mitchell Geckert
ATTORNEYS

Patented Mar. 26, 1929.

1,706,650

UNITED STATES PATENT OFFICE.

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT.

MORTISER.

Application filed December 30, 1925. Serial No. 78,319.

My invention relates to mortising machines of the so called "chain" type, in which the mortising act is performed by means of a driven toothed sprocket chain. The piece to be mortised is mounted upon a table, movable relatively to the chain. Ordinarily, the table itself is moved toward and from the chain by means of pressure manually applied through the medium of a treadle actuated by the foot. As this requires considerable muscular effort, it follows that the production of work is usually slow and is always fatiguing to the operator.

It may be said that one object of my present invention is to provide a construction whereby this feeding of the work to the chain is mechanically performed, as a result of which production is speeded up and fatigue eliminated. A further advantage of the mechanical feeding is that the feeding operation may be governed so as to proceed at a given rate, rather than by a varying rate, as is liable to result when human power alone is relied upon.

Again, in machines of this character it is customary to provide a hand-operated clamping means to hold the work in operative position on the table. To operate the clamping means by hand is necessarily relatively slow, and it may further be said that another object of the present invention is to provide a mechanically operated clamping means that will not only always operate at the proper time to clamp and unclamp the article to be worked upon, but one which is also so constructed that it will receive and properly grip work pieces of varying thicknesses. The construction of this clamp is also such that work pieces of varying thicknesses will always be clamped with substantially the same degree of force, this clamping action being accomplished wholly by mechanical means.

The foregoing and other objects will be apparent to a mechanic skilled in this art by a reading of the following description and an examination of the accompanying drawings, in which—

Fig. 2 is a front elevation of the machine shown in Fig. 1;

Fig. 3 is an enlarged sectional view of a part of an improved clamping means;

It should be understood at the outset that I have shown and shall describe only one preferred and successful form of my invention, and that I am aware that the same is susceptible of many changes and modifications in construction and design, without departing from the spirit of the invention or the scope of the following claims.

Figure 1:
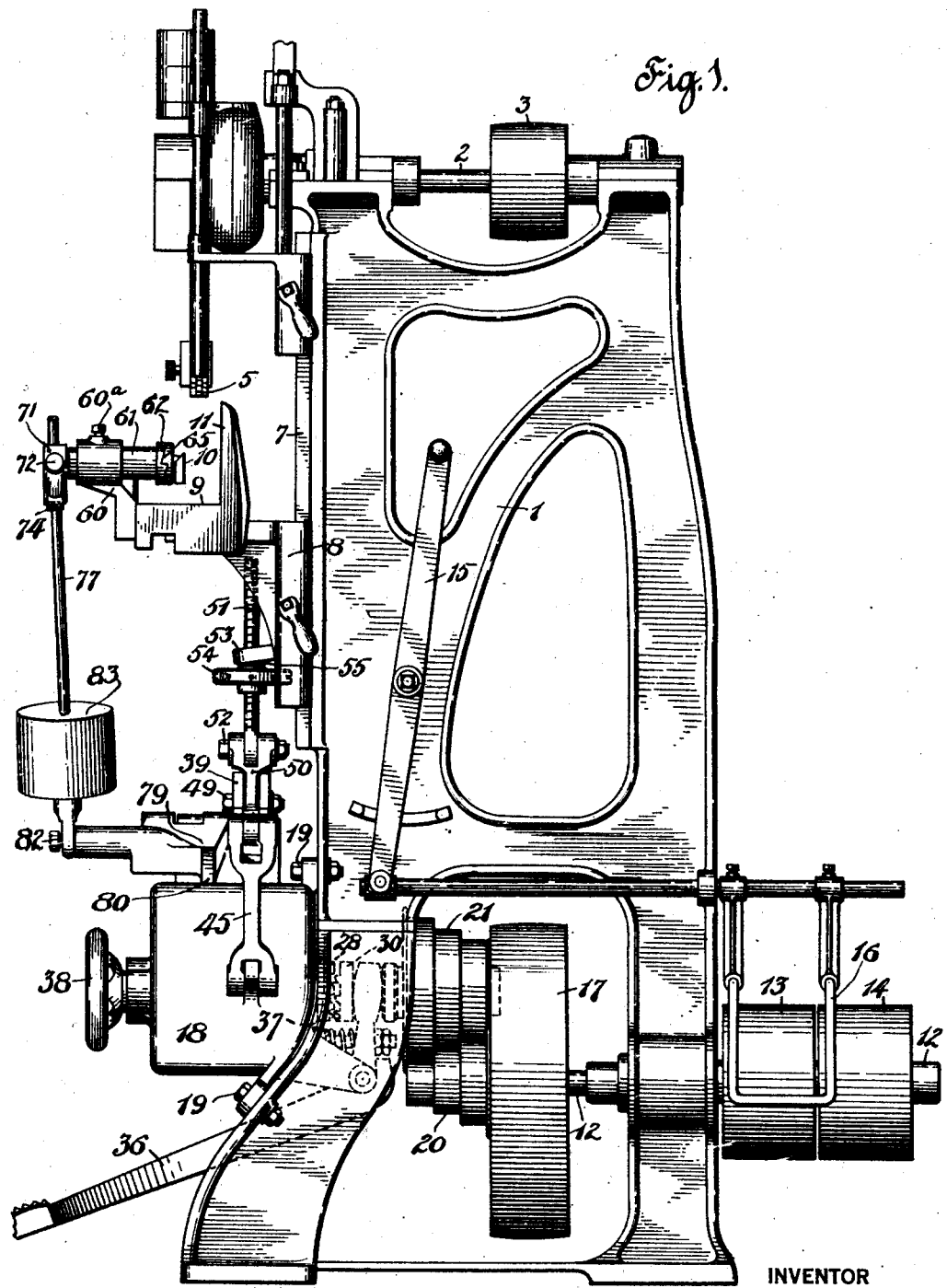
Fig. 1 is a side view in elevation of a mortiser embodying features of the invention.
Figure 5:
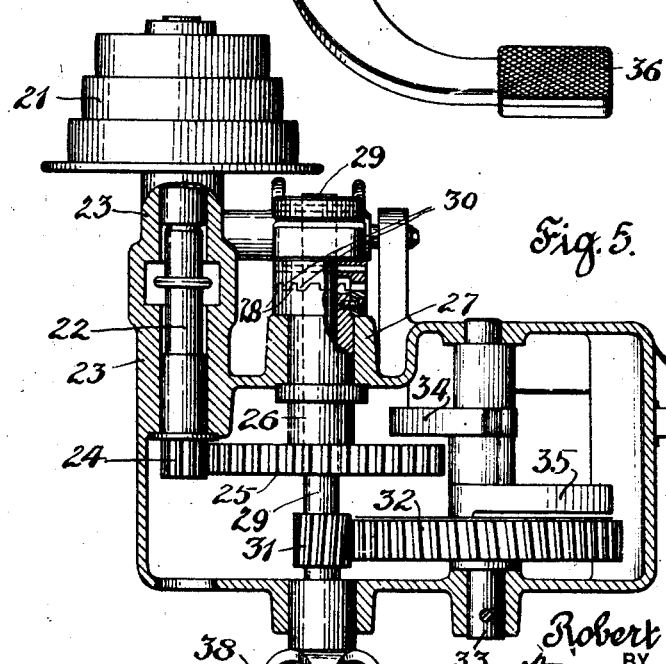
Fig. 5 is a sectional plan view of parts shown in Fig. 4.
Figure 6:
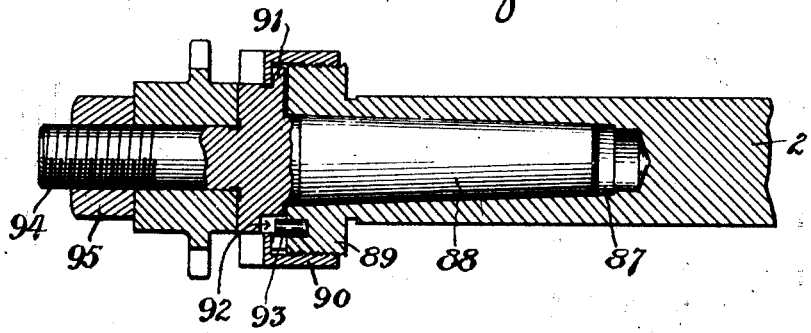
Fig. 6 is an enlarged detail view in section of a sprocket shaft, sprocket and sprocket center.
Figure 7:
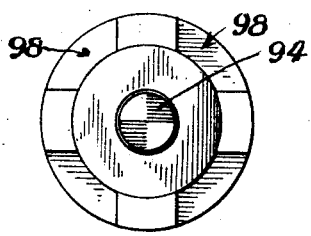
Fig. 7 is an end view of parts shown in Fig. 6, the sprocket and nut being omitted.
Figure 8:
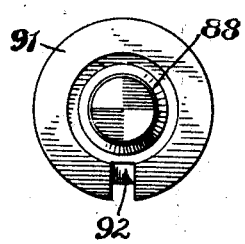
Fig. 8 is an end view of a sprocket center viewed from the right as seen in Fig. 6.
Figure 9:
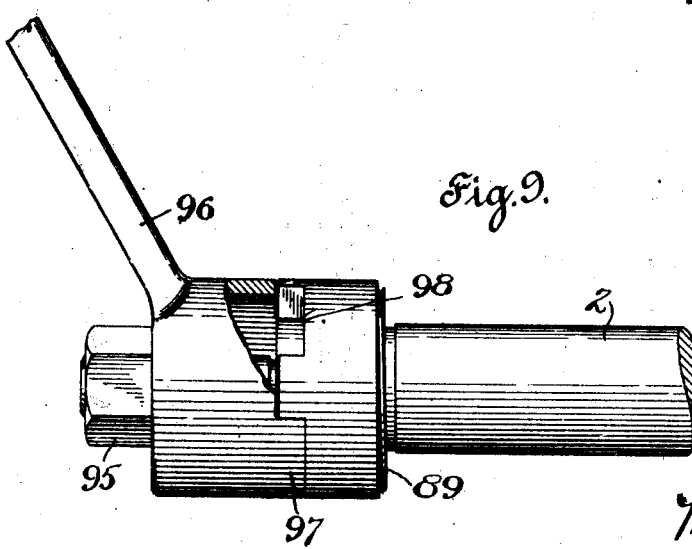
Fig. 9 is a fragmentary view in partial section of parts illustrating a method of stripping the sprocket center.

In the accompanying drawings, 1 represents a frame of suitable design for supporting the various parts. 2 is a sprocket shaft. 3 is a pulley thereon. 4 is a sprocket on the shaft 2 for driving a cutter chain 5, by which the mortises are formed. This chain is guided by an adjustable chain bar 6, provided with the usual roller bearing at the lower end thereof, to take the thrust of the tool against the work. 7 is a guideway, upon which the base 8 of the work table 9 is mounted to reciprocate. 10 is a clamp, which serves to securely hold the work piece (not shown) against the back plate 11 of the table during the mortising operation. 12 is the main driving shaft, which has thereon the usual fixed and loose pulleys 13, 14. 15 is a lever, which serves to actuate the usual belt shifter 16 for shifting a belt from the loose to the tight pulley, and vice versa. 17 is a pulley on the shaft 12, which may be connected by a belt (not shown) to the pulley 3 driving the cutter chain. 18 is a housing, which may be secured to the frame 1 by any suitable means, such as bolts 19—19, and on or within which automatic devices are carried for controlling the work clamping and feeding operation. 20—21 are complementary cone pulleys, the pulley 20 being carried on the shaft 12, while the pulley 21 is carried on the shaft 22, journaled at 23 in the housing 18. The shaft 22 carries a pinion 24, meshing with a gear 25, which has a sleeve 26 at one end, journaled in a bearing 27 on the housing. At the end of the sleeve 26 is a toothed clutch member 28. 29 is a shaft, journaled in the sleeve 26, and 30 is a second clutch member, complementary to the clutch member 28 and fastened to the shaft 29. 31 is a pinion on the shaft 29, meshing with a gear 32 rotatable on a shaft 33 in the housing 18. The gear 32 has a sleeve extension on which are mounted cams 34—35, for the purposes later described. The clutch jaw member 30 is movable into engagement with the clutch jaw member 28 by means of a foot treadle 36 (see Figure 1), which has suitable connections with said clutch member. 37 is a spring, acting in opposition to the treadle, to lift the latter and disengage the clutch members 28—30 when pressure on the foot treadle is released. Rotation of the shaft 12 will furnish power that may be transmitted to the shaft 22 through the aforesaid cone pulleys, which latter are connected in the usual manner by a belt (not shown). The pinion 24, carried by the shaft 22, will rotate the gear 25 and sleeve 26. If the clutch members 28—30 are disengaged, these gears 24—25 will operate idly, but if said clutch members 28—30 are engaged, as shown in Fig. 5, power will be transmitted through the shaft 29 and gears 31—32, so as to cause the cams 34—35 to rotate.

In order to provide for a hand operation of the cams for the purpose of making preliminary settings or adjustment, I provide a hand wheel 38 on the shaft 29, by which the angular position of said cams 34—35 may be shifted when the clutch members 28—30 are disengaged.

The cam 34 is designed to actuate the work table 9 and move it in a direction to feed the work piece against the cutter chain. 39 represents a lever, pivotally mounted at 40. The forward end of this lever carries a horn 41, having a suitable roller or follower 42 for engaging the surface of the cam 34. 43 is another lever, pivotally mounted at 44 on a link 45, which itself is pivotally mounted at 46 on the housing 18. The levers 39—43 are adjustably connected to each other, and for that purpose I may provide in each lever a series of apertures 47—48, respectively, to receive a connecting pin 49 which may be inserted in any pair of the aforesaid apertures in the two levers, so as to vary the effective throw of the upper end 50 of the lever 43. 51 is a lift rod, pivotally mounted at 52 to the upper end 50 of the lever 43. The upper end of the lift rod 51 passes through a lug or abutment 53 on the base 8 of the work table 9. The rod 51 is threaded and carries a spanner nut or hand wheel 54, preferably having a ball and socket connection, as indicated at 55, with the lug 53. By turning the hand wheel 54 the lowermost or starting position of the work table 9 may be adjusted to give proper clearance with the cutter chain for the insertion and removal of work pieces.

From the foregoing it will be seen that the initial starting position of the work table may be varied by rotating the hand wheel 54, while the length of the stroke of said work table may be varied by shifting the pivotal connection between the compound levers 39—43. When the pivot pin 49 is located in the apertures indicated in Fig. 4, the stroke of the table will be the shortest, whereas, if the pin is engaged in the set of apertures at the opposite end of the series shown, the stroke of the table will be the longest possible.

Figure 4:
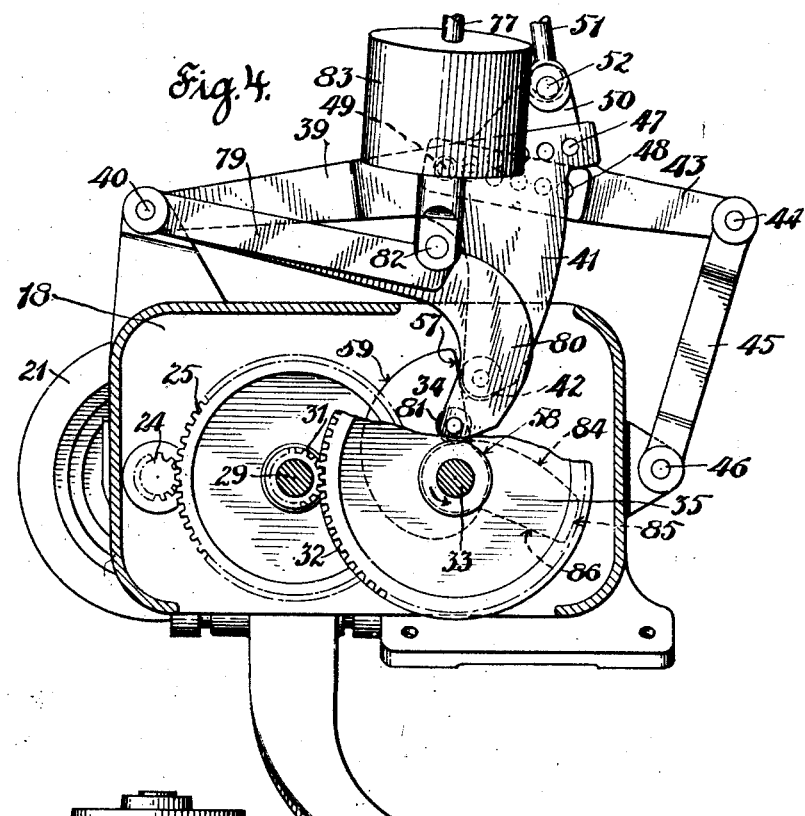
Fig. 4 is a view in section of parts of power driven means for actuating movable parts of the mortiser.

When the cam 34 is rotated in the direction of the arrow as viewed in Fig. 4, it will cause the work table to be reciprocated. In the position illustrated in this figure the follower 42 bears on the quick descent portion 57 of said cam, which will allow the table to drop rapidly until the follower 42 reaches the bottom of the portion 57. The cam 34 is provided with a substantially circular portion 58, designed to provide a substantial dwell of the work table at its lowest position, to give time for the operator to remove the finished piece and insert a new work piece to be mortised. 59 represents the rise portion on the cam 34, so designed as to cause the table to rise at a relatively slow and uniform rate of speed.

In order to permit the operator to rapidly feed the machine with new pieces to be mortised and to relieve him of the burden of manually operating the work clamp, I provide means for automatically clamping and unclamping the work piece while the table is at or near its lowest position. To that end the table 9 carries an arm or bracket 60 (see Fig. 3), which in turn adjustably carries a sleeve 61, held in place by a set screw 60ª. The sleeve 61 has at one end cam surfaces 62—62. 63 is a clamping shaft extending through the sleeve 61 and carrying a member 64 having cam faces 65—65, complementary to the cam faces 62—62. The work clamp 10 is on the extreme end of the shaft 63, it being held thereto in any suitable manner, as by a pin and groove connection, indicated, respectively, at 67—68. Manifestly, if the shaft 63 be rocked in one direction, the cam faces 62—65 will cause the work clamp 10 to quickly move toward the back plate 11 of the work table so as to grip the piece of work mounted on the said table. Rocking the shaft 63 in an opposite direction will cause the clamp 10 to be quickly retracted, so as to release the work piece.

To insure an unclamping action I may employ a spring 69, located in a counterbore 70 in the sleeve 61 and acting at one end against a head 71 on the shaft 63. The head 71 has a bore therein, in a direction transversely of the shaft 63. 72 is a pin rotatably held in the said bore by any suitable means. On the end of the pin 72 is a bifurcated head 73 which, in turn, may receive a disk member or the like 74, which is pivotally secured to the head 73 as by a pivot pin 75. The member 74 may be split, as indicated at 76 and may be provided with a clamping seat for a rod 77. 78 is a bolt for clamping the disk 74 tightly on the rod 77. By this means the rod 77 is adjustably connected to and may oscillate the shaft 63 without binding. 79 is a lever pivoted at 40 on the housing 18. The end of this lever has a downwardly projecting horn 80 (see Fig. 4), carrying a suitable follower 81 for engaging the surface of the cam 35. The rod 77 is connected at 82 to the lever 79. 83 is a weight mounted on the rod 77, and operates by gravity to urge the lever 79 downwardly, and hence in a direction to cause the work clamp 10 to move in a work clamping direction. The utilizing of a weight for this purpose is preferable, as it tends to cause the clamp 10 to engage the work pieces with substantial uniformity, even though the latter may vary somewhat in thickness. In the position shown in Fig. 4 the follower 81 has not yet been engaged by its cam 35, and hence the work clamp will be in the advanced position. The table is now descending, and a further rotation of the cams will cause the follower 81 to be engaged by the sharply inclined or rise portion 84 of the cam 35, and consequently the lever 79 will be quickly lifted so as to retract the work clamp and release the work piece from the table. 85 is a substantial dwell on the end of the cam 35, provided for the purpose of giving the operator sufficient time to remove a finished work piece and insert a new piece to be mortised. After the dwell 85, the follower 81 will encounter a rapid decline 86 on the cam 35, which permits the work clamp 10 to be quickly advanced through the medium of the weight 83, so as to grip any new work piece on the table before the table has ascended sufficiently to cause said piece to engage the cutter chain.

It will be apparent from the foregoing that the clamp may be adjusted to take stock of any thickness within the limits of the machine, by merely loosening the set screw 60ª (Fig. 1) and sliding the sleeve 61 to the desired position, where it may again be secured by said set screw 60ª.

In chain mortising machines it is usual to employ cutter chains of different sizes, in order to form mortises of different dimensions, and consequently it is necessary to change the chain driving sprocket. It has been usual to have these sprockets mounted on a removable sprocket center, fitted in a cylindrical bore in the sprocket driving shaft. As changes are made from time to time these sprocket centers tend to wear the bore in the sprocket shaft to such an extent as to make it exceedingly difficult or impossible to maintain a tight fit and prevent a weaving action of the chain. One object of the present invention is to overcome this difficulty, and this object is attained by the means illustrated in Figs. 6 to 9, in which the sprocket shaft 2 is shown as provided with a slightly tapered bore 87 for receiving the correspondingly tapered shank 88 of the sprocket center. 89 is a flange at the forward end of the shaft 2, which is threaded on its outer periphery, for receiving a union nut 90. The sprocket center has an enlarged boss or flange 91 facing the flange 89. 92 is a key seat in the flange 91 for receiving a key or pin 93, carried by the flange 89, and by it any independent rotation of the shaft center and shaft 2 is prevented. The union nut 90, when set up, draws the flange 91 toward the flange 89 and forces the tapered shank 88 securely into the tapered bore 87 of the shaft 2. The forward end of the sprocket center is suitably shaped to receive the chain sprocket 4, the end being threaded, as at 94, for receiving a nut 95. The thread 94 is preferably left handed, so that the normal driving rotation of the shaft 2 will not tend to loosen the nut 95.

When it is desired to remove the sprocket center from the shaft 2, the nut 95 and sprocket 4 are removed from the center. A spanner wrench 96 is then placed over the projecting end of the sprocket center with its projections 97 engaging in spanner notches 98 formed in the union nut 90, and the union nut is then partially removed. The nut 95 is then applied at the rear of the spanner wrench 96 and rotated relatively to said wrench until it exerts a pull sufficient to unseat the tapered shank 88 from the bore of the shaft 2.

From the foregoing it will be apparent that the operator is relieved of all severe muscular effort, and is likewise relieved of the time consuming operation of manually manipulating the work clamping means, as a result of which he may devote his attention more fully to the operation of the machine, and at the same time may feed the same much more rapidly than would otherwise be possible, for so long as the foot treadle 36 is depressed the machine will operate automatically and perform its work, the operator's only duty being to insert and remove the work pieces. If, for any reason, the operator is unable to remove any particular piece and insert a new one before the table starts to ascend, he may instantly stop the table feed by merely releasing pressure on the foot treadle. It will thus be seen that the operator at all times has complete control of the machine, so that he can meet any emergency, and he may at any time release the work clamp, if occasion requires, by merely lifting the weighted rod 77.

Inasmuch as the continuous feeding and automatic clamping mechanism is constructed as a unit, the same may be easily attached to many power mortising machines now in service, converting the same from foot power machines into the most approved automatic, labor-saving equipment, having a capacity far in excess of the existing machines in which the clamping and feeding of the work pieces depends solely upon manual effort.

I claim:

1. In a mortiser, a frame, a power driven mortise cutting means thereon, a work table, power driven means for moving said work table and cutting means relatively to each other to present a work article to said cutting means, said power driven means comprising interconnected levers, one of which is operated by a cam and the other connected to the table, the point of connection between the levers being adjustable to vary the stroke of the work table, said power driven means when set in motion serving to automatically maintain intermittent reciprocatory movement of said table and cutting means relatively to each other, and means for manually starting and stopping said power driven means.

2. In the combination defined in claim 1, said power driven means permitting a substantial dwell of said work table at one point in its travel.

3. In a mortiser, a frame, a power driven mortise cutting means carried thereby, a relatively reciprocable work table, a power driven cam, interengaging levers connecting said cam and work table whereby the latter may be reciprocated to and fro while said cam continues to rotate in one direction, said interengaging levers between said cam and work table being adjustably connected together and intersecting to vary the stroke of the work table.

4. In the combination defined in claim 3, and means to vary the normal position of said table.

5. In the combination defined in claim 3, said cam having a substantial dwell thereon for permitting said table to remain substantially stationary at one point in its travel whereby work articles may be placed thereon and removed therefrom.

6. An attachment unit for a mortiser having power driven mortise cutting means and a reciprocable work table, said attachment comprising a housing itself constituting a frame arranged to be secured to the frame of said mortiser, means arranged to receive power from the power driven means of said mortiser when the attachment is secured thereto carried by said housing frame for mechanically reciprocating said work table, and manually controllable means for starting and stopping said power driven means.

7. In a mortiser, a frame, a power driven chain mortise cutting means, a work table, said mortise cutting means and work table being relatively movable toward and from each other, a work clamping means on said work table, and power driven cam mechanism for mechanically controlling the movement of the work table and mortise cutting means toward and from each other and for mechanically controlling the operation of the work clamp at a certain predetermined position of the work table relatively to the mortise cutting means, said power driven cam mechanism being manually adjustable to different positions.

8. In a mortiser, a frame, a power driven chain mortise cutting means, a work table, said mortise cutting means and work table being relatively movable toward and from each other, a work clamping means on said work table, and power driven cam mechanism for mechanically controlling the movement of the work table and mortise cutting means toward and from each other and for mechanically controlling the operation of the work clamp at certain predetermined positions of the work table relatively to the mortise cutting means, and with a work table positioning means for adjusting the work table relatively to the cutting means to vary the depth of the mortise, said table controlling means including a pair of levers adjustably connected to each other at different points to vary the effective throw of one of the same.

9. An attachment unit for a mortiser having power driven mortise cutting means and a reciprocable work table, said attachment comprising a housing itself constituting a frame arranged to be secured to the frame of said mortiser, means arranged to receive power from the power driven means of said mortiser when the attachment is secured thereto, means carried by said housing frame for continuously reciprocating said work table and including interengaging levers the effective lengths of which may be adjusted to vary the movement imparted to said table by said driven means, and manually controllable means for starting and stopping said power driven means.

10. An attachment unit for a mortiser, having power driven mortise cutting means and a reciprocable work table, said attachment comprising a housing itself constituting a frame, means arranged to receive power from the power driven means of said mortiser when the attachment is secured thereto, carried by said housing frame for mechanically reciprocating said work table, manually controllable means for starting and stopping said power driven means, and manual means for operating the reciprocating means when the latter is disconnected from said power driven means.

ROBERT S. BROWN.